United States Patent
Shikata et al.

(10) Patent No.: US 10,050,972 B2
(45) Date of Patent: Aug. 14, 2018

(54) AUTHORITY MANAGEMENT SYSTEM, SERVER SYSTEM, NON-TRANSITORY COMPUTER-READABLE STORAGE MEDIUM HAVING STORED THEREIN AUTHORITY MANAGEMENT PROGRAM, AND AUTHORITY MANAGEMENT METHOD

(71) Applicant: NINTENDO CO., LTD., Kyoto (JP)

(72) Inventors: Masaki Shikata, Kyoto (JP); Kazuhiro Wabe, Kyoto (JP); Masahiro Nagao, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 681 days.

(21) Appl. No.: 14/028,903

(22) Filed: Sep. 17, 2013

(65) Prior Publication Data
US 2014/0143311 A1 May 22, 2014

(30) Foreign Application Priority Data
Nov. 16, 2012 (JP) ................................ 2012-252259

(51) Int. Cl.
*G06F 15/16* (2006.01)
*H04L 29/06* (2006.01)
(52) U.S. Cl.
CPC .......... *H04L 63/102* (2013.01); *H04L 63/083* (2013.01)
(58) Field of Classification Search
CPC ...... H04L 29/06; H04L 63/102; H04L 63/083
See application file for complete search history.

(56) References Cited

U.S. PATENT DOCUMENTS

| 7,992,190 B2 * | 8/2011 | Mevissen ............... H04L 63/10 709/225 |
| 2003/0149696 A1 * | 8/2003 | Nelson .................... G06Q 30/06 |

(Continued)

FOREIGN PATENT DOCUMENTS

| JP | 2007-518192 | 7/2007 |
| JP | 2009-176099 | 8/2009 |
| JP | 2012-512475 | 5/2012 |

OTHER PUBLICATIONS

NPL Giving a Windows XP account administrative rights, Feb. 14, 2009 snapshot, Hereinafter "Windows XP" URL:http://www.computerhope.com/issues/ch001097.htm.*

(Continued)

*Primary Examiner* — Viet D Vu
(74) *Attorney, Agent, or Firm* — Nixon & Vanderhye P.C.

(57) ABSTRACT

A storage device of an example shop server stores, with respect to each of users of an information processing apparatus, user authority information indicating authority given to the user, together with user identification information for identifying the user. The user authority information is associated with the information processing apparatus used by the user corresponding to the user authority information. When the shop server has received from an information processing apparatus through a communication apparatus the user identification information of a first user who uses the information processing apparatus, a processor of the shop server performs, on the basis of the user authority information of the first user and the user authority information of a second user associated with the same information processing apparatus, information processing based on the authority indicated by the user authority information of the first user and the user authority information of the second user.

13 Claims, 10 Drawing Sheets

(56) References Cited

U.S. PATENT DOCUMENTS

| | | | | |
|---|---|---|---|---|
| 2003/0208562 A1* | 11/2003 | Hauck | ................ | H04L 63/08 |
| | | | | 709/219 |
| 2005/0153682 A1 | 7/2005 | Minear et al. | | |
| 2006/0117378 A1* | 6/2006 | Tam | ................ | G06F 21/10 |
| | | | | 726/3 |
| 2009/0240796 A1* | 9/2009 | Yokoyama | ................ | H04L 41/0893 |
| | | | | 709/223 |
| 2011/0035799 A1* | 2/2011 | Handler | ................ | G06F 21/606 |
| | | | | 726/21 |
| 2011/0072039 A1* | 3/2011 | Tayloe | ................ | G06F 21/6218 |
| | | | | 707/769 |
| 2011/0258326 A1* | 10/2011 | Hu | ................ | H04L 63/062 |
| | | | | 709/226 |

OTHER PUBLICATIONS

[Online], "Manage your Microsoft Account", http://support.xbox.com/en-US/billing-and-subscriptions/account-management/microsoft-account-faq, Microsoft Account Security, Xbox.com, 3 pages, searched Nov. 7, 2012.

\* cited by examiner

FIG. 3

| USER AUTHORITY INFORMATION ||| 
|---|---|---|
| USER IDENTIFICATION INFORMATION | PURCHASED APPLICATION | APPARATUS FOR USE |
| USER A | APPLICATION A APPLICATION B | INFORMATION PROCESSING APPARATUS A |
| USER B | APPLICATION A | INFORMATION PROCESSING APPARATUS B |
| USER C | APPLICATION C | INFORMATION PROCESSING APPARATUS C |
| USER D | APPLICATION B APPLICATION D | INFORMATION PROCESSING APPARATUS D |
| ⋮ | ⋮ | ⋮ |
| USER K | APPLICATION D | INFORMATION PROCESSING APPARATUS A |
| USER L | APPLICATION C | INFORMATION PROCESSING APPARATUS A |
| ⋮ | ⋮ | ⋮ |

FIG. 4

| APPARATUS AUTHORITY INFORMATION ||
|---|---|
| APPARATUS IDENTIFICATION INFORMATION | PRE-INSTALLED APPLICATION |
| INFORMATION PROCESSING APPARATUS A | APPLICATION E |
| INFORMATION PROCESSING APPARATUS B | APPLICATION E |
| INFORMATION PROCESSING APPARATUS C | APPLICATION E APPLICATION F |
| INFORMATION PROCESSING APPARATUS D | NO APPLICATION |
| ⋮ | ⋮ |

F I G. 6

| REGISTERED USER INFORMATION |||
|---|---|---|
| USER NUMBER | USER NAME | USER IDENTIFICATION INFORMATION |
| 1 | ○○○○ | USER A |
| 2 | ○○○○ | USER K |
| 3 | ○○○○ | USER L |
| 4 | ○○○○ | NOT YET ACQUIRED |
| ⋮ | ⋮ | ⋮ |

F I G. 1 1

| SHARABLE RANGE INFORMATION ||
| APPLICATION IDENTIFICATION INFORMATION | SHARABLE RANGE |
|---|---|
| APPLICATION A | ALL USERS ASSOCIATED WITH SAME INFORMATION PROCESSING APPARATUS AS THAT OF PURCHASING USER |
| APPLICATION B | ALL USERS ASSOCIATED WITH SAME INFORMATION PROCESSING APPARATUS AS THAT OF PURCHASING USER |
| APPLICATION C | PURCHASING USER ONLY |
| APPLICATION D | USER PREDETERMINED AGE OR OVER AMONG ALL USERS ASSOCIATED WITH SAME INFORMATION PROCESSING APPARATUS AS THAT OF PURCHASING USER |
| ⋮ | ⋮ |

AUTHORITY MANAGEMENT SYSTEM, SERVER SYSTEM, NON-TRANSITORY COMPUTER-READABLE STORAGE MEDIUM HAVING STORED THEREIN AUTHORITY MANAGEMENT PROGRAM, AND AUTHORITY MANAGEMENT METHOD

CROSS REFERENCE TO RELATED APPLICATION

The disclosure of Japanese Patent Application No. 2012-252259, filed on Nov. 16, 2012, is incorporated herein by reference.

FIELD

The technology disclosed herein relates to an authority management system, a server system, a non-transitory computer-readable storage medium having stored therein an authority management program, and an authority management method, and in particular, relates to an authority management system, a server system, and an authority management method that, on the basis of user authority information indicating authority given to a user, perform information processing based on the authority indicated by the user authority information, and a non-transitory computer-readable storage medium having stored therein an authority management program that, on the basis of user authority information indicating authority given to a user, performs information processing based on the authority indicated by the user authority information.

BACKGROUND AND SUMMARY

Conventionally, when a service provided by a server apparatus on a network is used, generally, the server apparatus creates, with respect to each user, an account for specifying the user, and determines, on the basis of the created account, whether or not a user attempting to use the service is an authorized user.

The mere creation of an account with respect to each user, however, cannot flexibly manage authority.

Thus, it is desired to achieve an authority management system, a server system, an authority management program, and an authority management method that are capable of flexibly managing authority.

The above object can be achieved by, for example, the following configurations.

A first exemplary configuration is an authority management system including a server system and a plurality of information processing apparatuses. Each of the information processing apparatuses includes: a user registration unit configured to register a plurality of users as users of the information processing apparatus; and a first communication unit configured to communicate with the server system. The server system includes a second communication unit, a user authority information storage unit, and an information processing unit. The second communication unit communicates with the information processing apparatus. The user authority information storage, with respect to each of the plurality of users registered in the information processing apparatus, stores user authority information indicating authority given to the user, together with user identification information for identifying the user. The information processing unit, on the basis of the user authority information, performs information processing based on the authority indicated by the user authority information. The user authority information is associated with the information processing apparatus used by the user corresponding to the user authority information. When the server system has received from any one of the information processing apparatuses through the second communication unit the user identification information of, among the users of the information processing apparatus, a first user who uses the information processing apparatus, the information processing unit performs, on the basis of the user authority information of the first user and the user authority information of, among the users of the information processing apparatus, a second user associated with the same information processing apparatus, information processing based on the authority indicated by the user authority information of the first user and the user authority information of the second user.

When the server system has received the user identification information of the first user from the information processing apparatus through the second communication unit, the information processing unit, if a predetermined condition is satisfied, may perform information processing based on the authority indicated by the user authority information of the second user, on the assumption that the first user is given the same authority as authority of the second user.

The user authority information may include information indicating application software. The information processing unit may make a setting so as to give the first user the same authority as authority of the second user with respect to each of pieces of application software.

The user authority information may include information indicating application software that the user corresponding to the user authority information is permitted to execute in the information processing apparatus.

The server system may further include an apparatus authority information storage unit configured to, with respect to each of the information processing apparatuses, store apparatus authority information indicating authority given to the information processing apparatus, together with apparatus identification information for identifying the information processing apparatus.

The apparatus authority information may include information indicating application software pre-installed on the information processing apparatus corresponding to the apparatus authority information, and the user authority information may include information indicating application software purchased by the user corresponding to the user authority information.

The server system may further include a charging process unit and a user authority information update unit. The charging process unit, when the server system has received from the information processing apparatus through the second communication unit a request to purchase application software, performs a charging process for charging a user currently operating the information processing apparatus an amount of money based on the application software. The user authority information update unit, in accordance with the charging process performed by the charging process unit, updates the user authority information corresponding to the user so as to permit the user to execute the application software in the information processing apparatus.

The user authority information may be generated on the basis of a user input provided to the information processing apparatus, and the apparatus authority information may be automatically generated, not on the basis of a user input provided to the information processing apparatus.

The server system may further include a local user authority information transmission unit configured to, when the server system has communicated with the information processing apparatus through the second communication unit, transmit, with respect to each of pieces of the user authority information associated with the information processing apparatus, information indicating application software that the user corresponding to the piece of the user authority information is permitted to execute in the information processing apparatus, as local user authority information to the information processing apparatus. The information processing apparatus may further include: a local user authority information storage unit configured to store the local user authority information transmitted from the local user authority information transmission unit; and a determination unit configured to determine, on the basis of the local user authority information, whether or not the application software can be executed in the information processing apparatus.

When the server system has communicated with the information processing apparatus through the second communication unit, the local user authority information transmission unit, unconditionally or if a predetermined condition is satisfied, may transmit to the information processing apparatus the latest local user authority information based on the user authority information associated with the information processing apparatus and stored in the user authority information storage unit. The information processing apparatus may further include an update unit configured to, on the basis of the latest local user authority information transmitted from the local user authority information transmission unit, update the local user authority information stored in the local user authority information storage unit.

A second exemplary configuration is a server system including a communication unit, a user authority information storage unit, and an information processing unit. The communication unit communicates with an information processing apparatus. The user authority information storage unit, with respect to each of a plurality of users registered in the information processing apparatus, stores user authority information indicating authority given to the user, together with user identification information for identifying the user. The information processing unit, on the basis of the user authority information, performs information processing based on the authority indicated by the user authority information. The user authority information is associated with the information processing apparatus used by the user corresponding to the user authority information. When the server system has received from an information processing apparatus through the communication unit the user identification information of, among the users of the information processing apparatus, a first user who uses the information processing apparatus, the information processing unit performs, on the basis of the user authority information of the first user and the user authority information of, among the users of the information processing apparatus, a second user associated with the same information processing apparatus, information processing based on the authority indicated by the user authority information of the first user and the user authority information of the second user.

A third exemplary configuration is an authority management program to be executed by a computer of a server system including a communication unit configured to communicate with an information processing apparatus. The authority management program causes the computer to execute: with respect to each of a plurality of users registered in the information processing apparatus, storing user authority information indicating authority given to the user, together with user identification information for identifying the user; and on the basis of the user authority information, performing information processing based on the authority indicated by the user authority information. The user authority information is associated with the information processing apparatus used by the user corresponding to the user authority information. When the user identification information of, among the users of the information processing apparatus, a first user who uses the information processing apparatus has been received from an information processing apparatus through the communication unit, on the basis of the user authority information of the first user and the user authority information of, among the users of the information processing apparatus, a second user associated with the same information processing apparatus, information processing based on the authority indicated by the user authority information of the first user and the user authority information of the second user is performed.

The authority management program may be stored in any computer-readable storage medium such as a CD or a DVD.

A fourth exemplary configuration is an authority management method to be executed by a server system including a communication unit configured to communicate with an information processing apparatus. The authority management method includes: with respect to each of a plurality of users registered in the information processing apparatus, storing user authority information indicating authority given to the user, together with user identification information for identifying the user; and on the basis of the user authority information, performing information processing based on the authority indicated by the user authority information. The user authority information is associated with the information processing apparatus used by the user corresponding to the user authority information. When the user identification information of, among the users of the information processing apparatus, a first user who uses the information processing apparatus has been received from an information processing apparatus through the communication unit, on the basis of the user authority information of the first user and the user authority information of, among the users of the information processing apparatus, a second user associated with the same information processing apparatus, information processing based on the authority indicated by the user authority information of the first user and the user authority information of the second user is performed.

Based on the exemplary embodiment, it is possible to, on the basis of a plurality of pieces of user authority information associated with the same information processing apparatus, perform information processing based on authority indicated by the pieces of user authority information. This makes it possible to flexibly manage authority.

These and other objects, features, aspects and advantages of the exemplary embodiment will become more apparent from the following detailed description of the exemplary embodiments when taken in conjunction with the accompanying drawings.

BRIEF DESCRIPTION OF THE DRAWINGS

FIG. 3 is a diagram showing a non-limiting example of user authority information stored in the server apparatus;

FIG. 4 is a diagram showing a non-limiting example of apparatus authority information stored in the server apparatus;

FIG. 6 is a diagram showing a non-limiting example of registered user information stored in the information processing apparatus;

FIG. 11 is a diagram showing a non-limiting example of sharable range information stored in the server apparatus.

DETAILED DESCRIPTION OF NON-LIMITING EXAMPLE EMBODIMENTS

With reference to the drawings, an exemplary embodiment is described.

Figure 1:
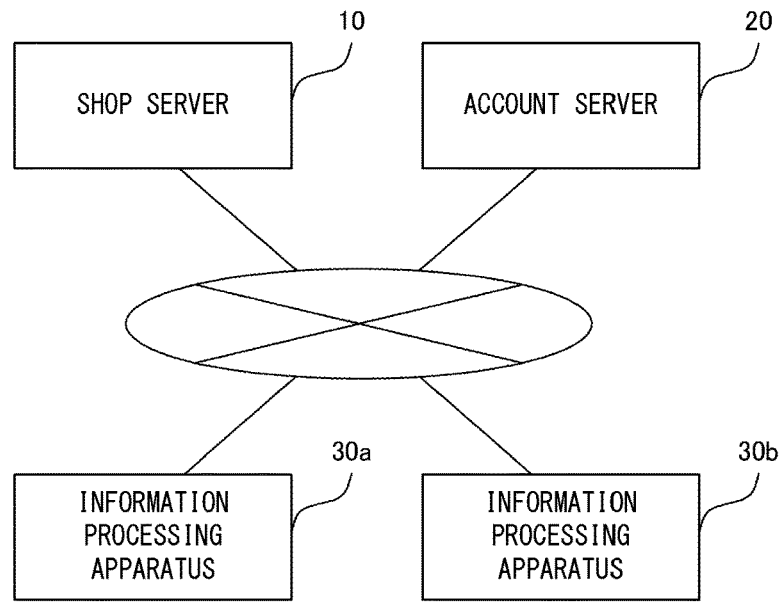
FIG. 1 is a diagram showing a non-limiting example of the overall configuration of a system.

In FIG. 1, information processing apparatuses 30a and 30b are information processing apparatuses having communication functions. The information processing apparatuses 30a and 30b are, for example, game apparatuses. It should be noted that in the following descriptions, the information processing apparatuses 30a and 30b will be collectively referred to as "information processing apparatuses 30" if it is not particularly necessary to distinguish the information processing apparatuses 30a and 30b from each other.

A shop server 10 is a server apparatus that provides a service in which a user can purchase application software (hereinafter occasionally referred to simply as an "application") and download the purchased application to any one of the information processing apparatuses 30.

An account server 20 is a server apparatus having the function of assigning each of the users of the information processing apparatuses 30 user identification information for uniquely identifying the user, and the function of managing information regarding the user (for example, a password, the date of birth, the sex, and the like) in association with the user identification information.

Figure 2:
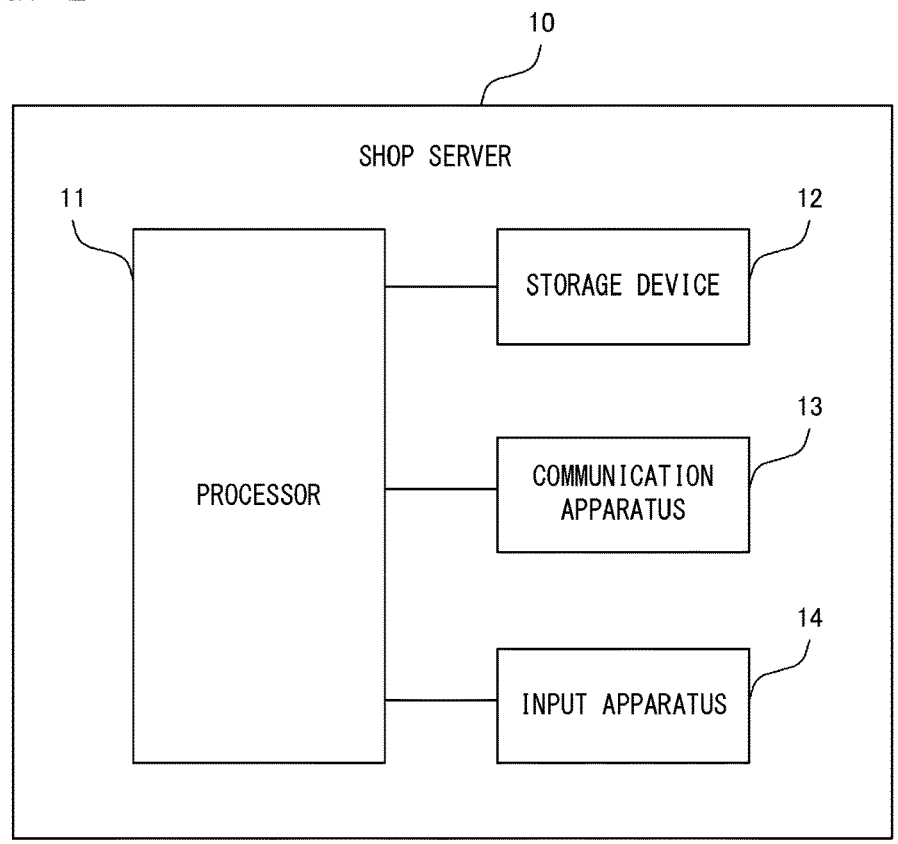
FIG. 2 is a diagram showing a non-limiting example of the configuration of a server apparatus.

Next, with reference to FIG. 2, the specific configuration of the shop server 10 is described.

In FIG. 2, the shop server 10 includes a processor 11, a storage device 12, a communication apparatus 13, and an input apparatus 14.

The shop server 10 has the function of, when having received from any one of the information processing apparatuses 30 a request to purchase an application, performing a charging process and downloading the purchased application to the information processing apparatus 30. The storage device 12 stores various applications to be downloaded to the information processing apparatuses 30.

The storage device 12 stores, for example, user authority information as shown in FIG. 3 with respect to each of the users of the information processing apparatuses 30. The user authority information is information indicating authority given to the user. The user authority information includes user identification information for uniquely identifying each of a plurality of users to use a service provided by the shop server 10 (user identification information assigned to each user by the account server 20 in the exemplary embodiment), and information indicating applications purchased by the user. In the exemplary embodiment, a user having purchased an application is given authority to download and execute the application. For example, in FIG. 3, a user A and a user B are given authority to download and execute an application A, and the user A and a user D are given authority to download and execute an application B. The user authority information is updated every time a user purchases a new application. Each of the pieces of user identification information is associated with the information processing apparatus 30 used by a user. For example, each of the pieces of user identification information includes an apparatus identification code (typically, a serial number) for uniquely identifying the information processing apparatus 30 used by a user.

The storage device 12 stores, in addition to the user authority information, apparatus authority information as shown in FIG. 4 with respect to each of the information processing apparatuses 30. The apparatus authority information is information indicating authority given to the information processing apparatus 30. The apparatus authority information includes apparatus identification information for uniquely identifying the information processing apparatus (typically, a serial number), and information indicating pre-installed applications installed in advance on the information processing apparatus 30 (that is, before the information processing apparatus 30 is sold to a customer).

The shop server 10 also has the function of, when having received from any one of the information processing apparatuses 30 a request to download an application, downloading an application purchased in the past by the user of the information processing apparatus 30 to the information processing apparatus 30 again, and downloading to the information processing apparatus 30 an additional content and the like that can be used in the application.

Figure 5:
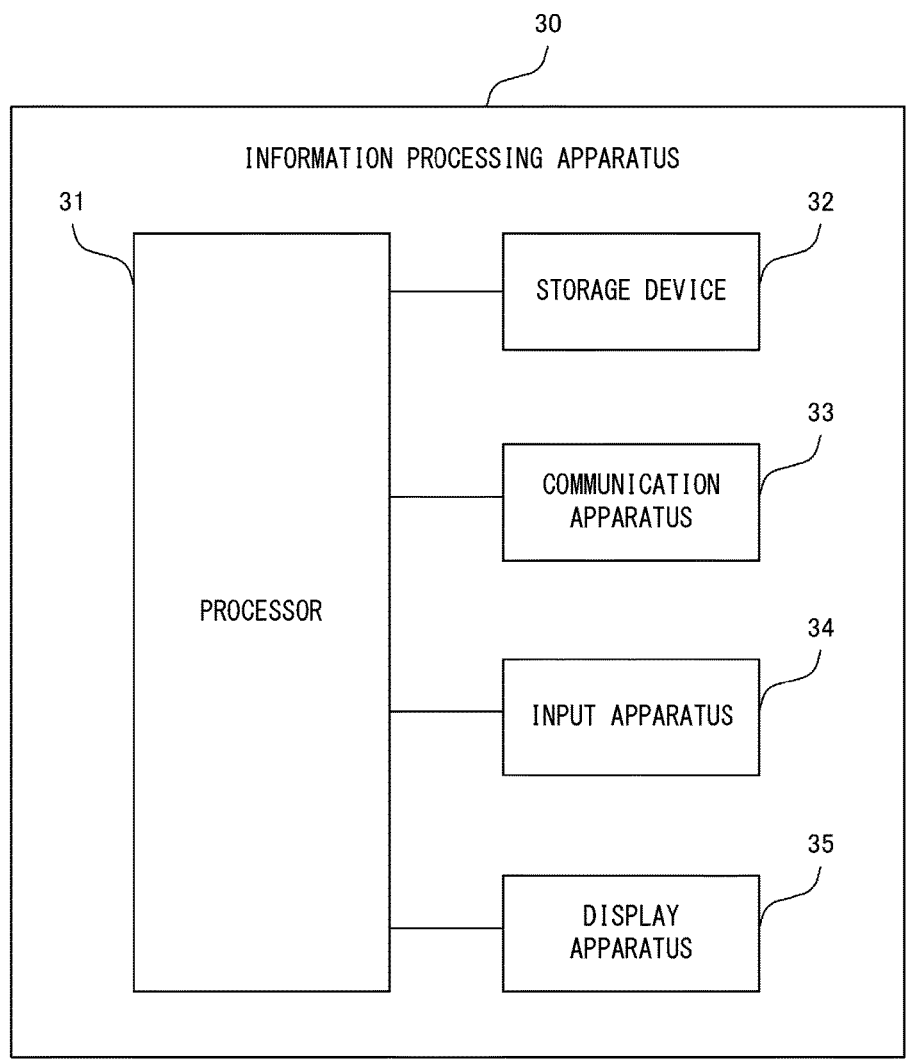
FIG. 5 is a diagram showing a non-limiting example of the configuration of an information processing apparatus.

Next, with reference to FIG. 5, the specific configuration of each information processing apparatus 30 is described.

In FIG. 5, the information processing apparatus 30 includes a processor 31, a storage device 32, a communication apparatus 33, an input apparatus 34, and a display apparatus 35.

In the storage device 32, the apparatus identification code assigned to the information processing apparatus 30 is stored in advance (that is, before the information processing apparatus 30 is sold to a customer).

The storage device 32 stores registered user information as shown in FIG. 6. In each information processing apparatus 30, for example, up to twelve users can be registered as users to use the information processing apparatus 30. The registered user information is generated with respect to each of the registered users. The registered user information includes information such as a user number and a user name for identifying each user. If the information processing apparatus 30 has accessed the account server 20 and has acquired user identification information from the account server 20, the acquired user identification information is stored in the registered user information.

The storage device 32 also stores a pre-installed application, an application downloaded from the shop server 10, local authority information as described later, and the like.

The processor 31 can execute the various applications stored in the storage device 32 to perform processing based on an instruction input by a user through the input apparatus 34, and to cause an image reflecting the result of the processing to be displayed on the display apparatus 35.

Figure 7:
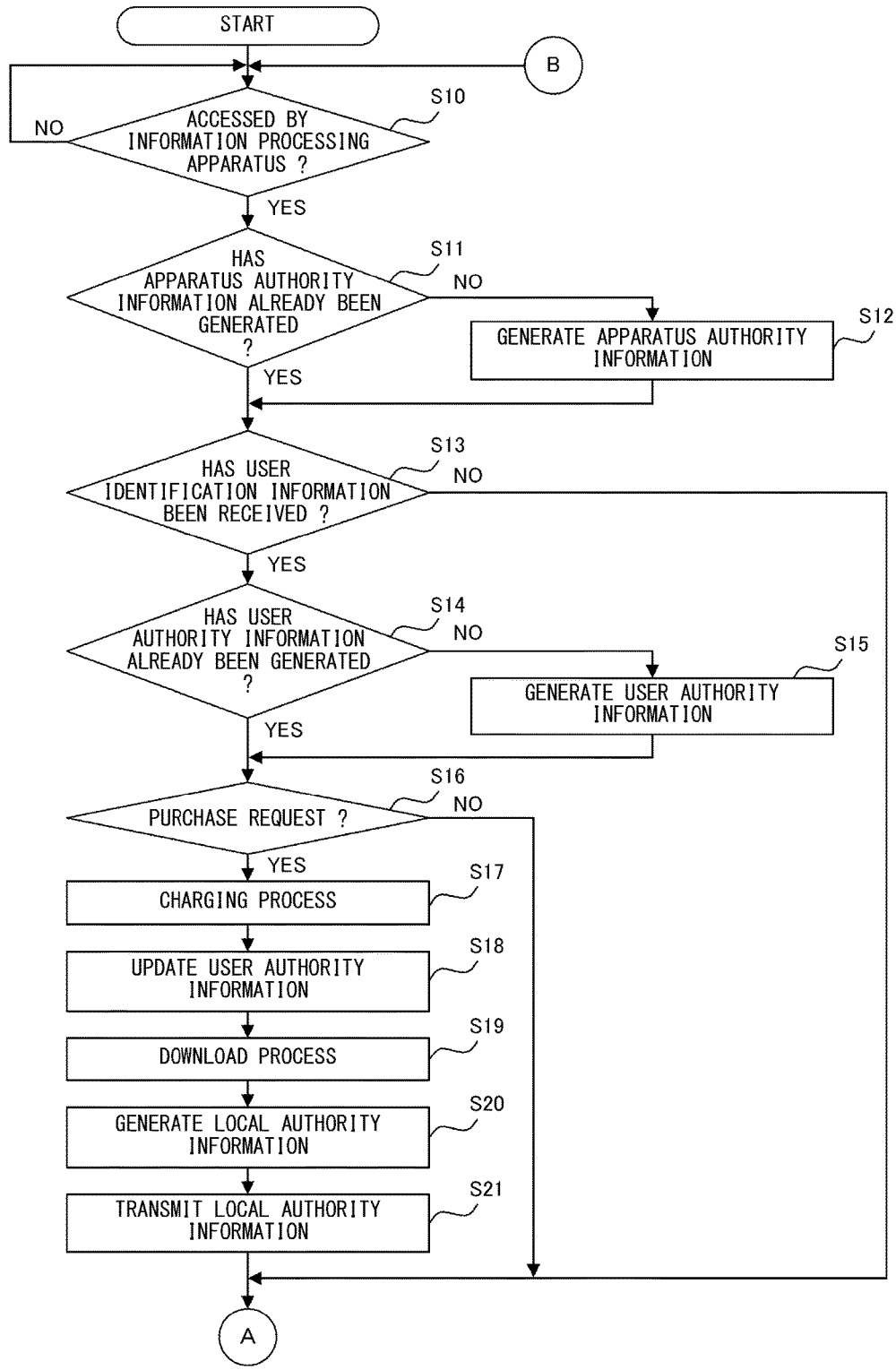
FIG. 7 is a flow chart showing a non-limiting example of a part of the flow of the processing performed by the server apparatus.
Figure 8:
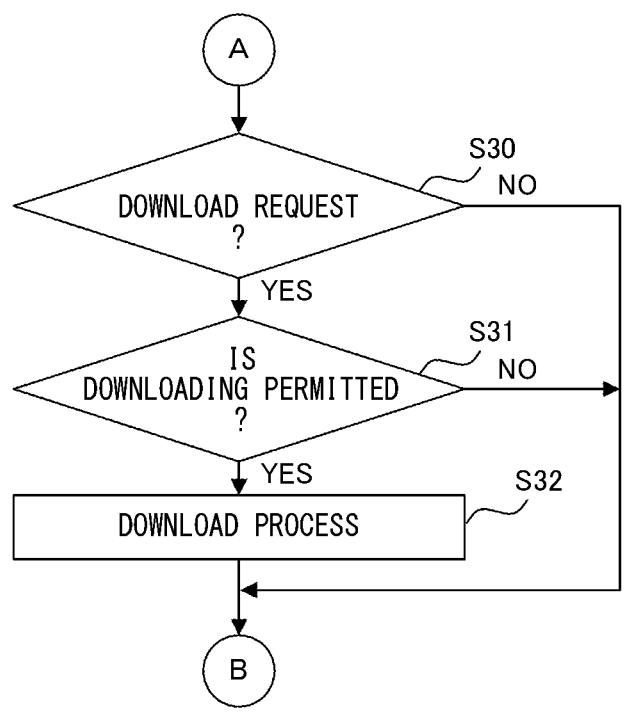
FIG. 8 is a flow chart showing a non-limiting example of another part of the flow of the processing performed by the server apparatus.

Next, with reference to flow charts of FIGS. 7 and 8, the operation of the server apparatus 10 is described. It should be noted that the processing shown in the flow charts is performed by the processor 11 in accordance with a predetermined computer program. The computer program may be installed in advance on the server apparatus 10, or may be provided to the server apparatus 10 through any computer-readable storage medium such as a CD or a DVD, or may be provided to the server apparatus 10 through communication with another information processing apparatus.

Referring to FIG. 7, in step S10, the processor 11 determines whether or not any one of the information processing apparatuses 30 has accessed the shop server 10. If any one of the information processing apparatuses 30 has accessed the shop server 10, the processing proceeds to step S11.

In step S11, the processor 11 determines, with reference to the apparatus identification information received from the information processing apparatus 30, whether or not the apparatus authority information corresponding to the information processing apparatus 30 has already been generated (that is, whether or not the apparatus authority information corresponding to the apparatus identification information received from the information processing apparatus 30 has already been stored in the storage device 12). Then, if the apparatus authority information corresponding to the information processing apparatus 30 has already been generated, the processing proceeds to step S13. If not, the processing proceeds to step S12.

In step S12, the processor 11 generates the apparatus authority information corresponding to the apparatus identification information received from the information processing apparatus 30, and stores the generated apparatus authority information in the storage device 12. It should be noted that information regarding pre-installed applications that is included in the apparatus authority information may be received from the information processing apparatus 30, or may be acquired by accessing a database in which the correspondence relationships between the apparatus identification information and pre-installed applications are defined.

In step S13, the processor 11 determines whether or not user identification information has been received from the information processing apparatus 30. Then, if user identification information has been received, the processing proceeds to step S14. If not, the processing proceeds to step S30 in FIG. 8.

In step S14, the processor 11 determines, with reference to the user identification information received from the information processing apparatus 30, whether or not the user authority information corresponding to the user currently operating the information processing apparatus 30 has already been generated (that is, whether or not the user authority information corresponding to the user identification information received from the information processing apparatus 30 has already been stored in the storage device 12). Then, if the user authority information corresponding to the user currently operating the information processing apparatus 30 has already been generated, the processing proceeds to step S16. If not, the processing proceeds to step S15.

In step S15, the processor 11 generates the user authority information corresponding to the user identification information received from the information processing apparatus 30, and stores the generated user authority information in the storage device 12.

In step S16, the processor 11 determines whether or not a request to purchase an application has been received from the information processing apparatus 30. Then, if a request to purchase an application has been received, the processing proceeds to step S17. If not, the processing proceeds to step S30 in FIG. 8.

In step S17, the processor 11 performs a charging process for the application that the information processing apparatus 30 has made the request to purchase.

In step S18, the processor 11 updates the user authority information corresponding to the user currently operating the information processing apparatus 30 (that is, the user authority information corresponding to the user identification information received from the information processing apparatus 30). Specifically, the processor 11 adds information indicating the currently purchased application to the information regarding purchased applications that is included in the user authority information.

In step S19, the processor 11 reads the currently purchased application from the storage device 12 and downloads the currently purchased application to the information processing apparatus 30 through the communication apparatus 13.

In step S20, the processor 11 generates the local authority information corresponding to the information processing apparatus 30. The local authority information includes, for example, the contents of the pieces of user authority information of one or more users associated with the information processing apparatus 30, and the content of the apparatus authority information corresponding to the information processing apparatus 30, the pieces of user authority information and the apparatus authority information stored in the storage device 12. It should be noted that it is preferable that the local authority information should be encrypted in order to prevent a malicious user from dishonestly falsifying the local authority information.

In step S21, the processor 11 transmits the local authority information generated in step S20 to the information processing apparatus 30.

Referring to FIG. 8, in step S30, the processor 11 determines whether or not a request to download an application has been received from the information processing apparatus 30. Then, if a request to download an application has been received, the processing proceeds to step S31. If not, the processing returns to step S10 in FIG. 7.

In step S31, the processor 11 determines whether or not the user currently operating the information processing apparatus 30 is permitted to download the application that the information processing apparatus 30 has made the request to download. If the user is permitted to download the application, the processing proceeds to step S32. If not, the processing returns to step S10 in FIG. 7. Specifically, the processor 11 makes the determination with reference to, in addition to the user authority information of the user currently operating the information processing apparatus 30, also the user authority information of another user associated with the same information processing apparatus 30 as the information processing apparatus 30 of the user.

In the exemplary embodiment, as an example, if an application has been purchased by any one of the users of the same information processing apparatus 30, the processor 11 permits not only the user having purchased the application but also another user of the information processing apparatus 30 to download the application. Thus, for example, in FIG. 3, a "user K" is permitted to download, in addition to an application D purchased in the past by the user K, also applications (the application A, the application B, and an application C) purchased in the past by other users (the user A and a user L) associated with the same information processing apparatus A. It should be noted that the case where it is desired to download again an application purchased in the past may be the case where the application needs to be installed again because the application stored in the information processing apparatus 30 has been accidentally deleted or data of the application has been corrupted.

It should be noted that the processor 11 may permit the downloading of not only an application purchased through the shop server 10, but also an application that had been pre-installed on the information processing apparatus 30. It is possible to determine, on the basis of the apparatus authority information, whether or not the application that the information processing apparatus 30 has made the request to download is a pre-installed application.

In step S32, the processor 11 reads from the storage device 12 the application that the information processing apparatus 30 has made the request to download, and the processor 11 downloads the read application to the information processing apparatus 30 through the communication apparatus 13.

Figure 9:
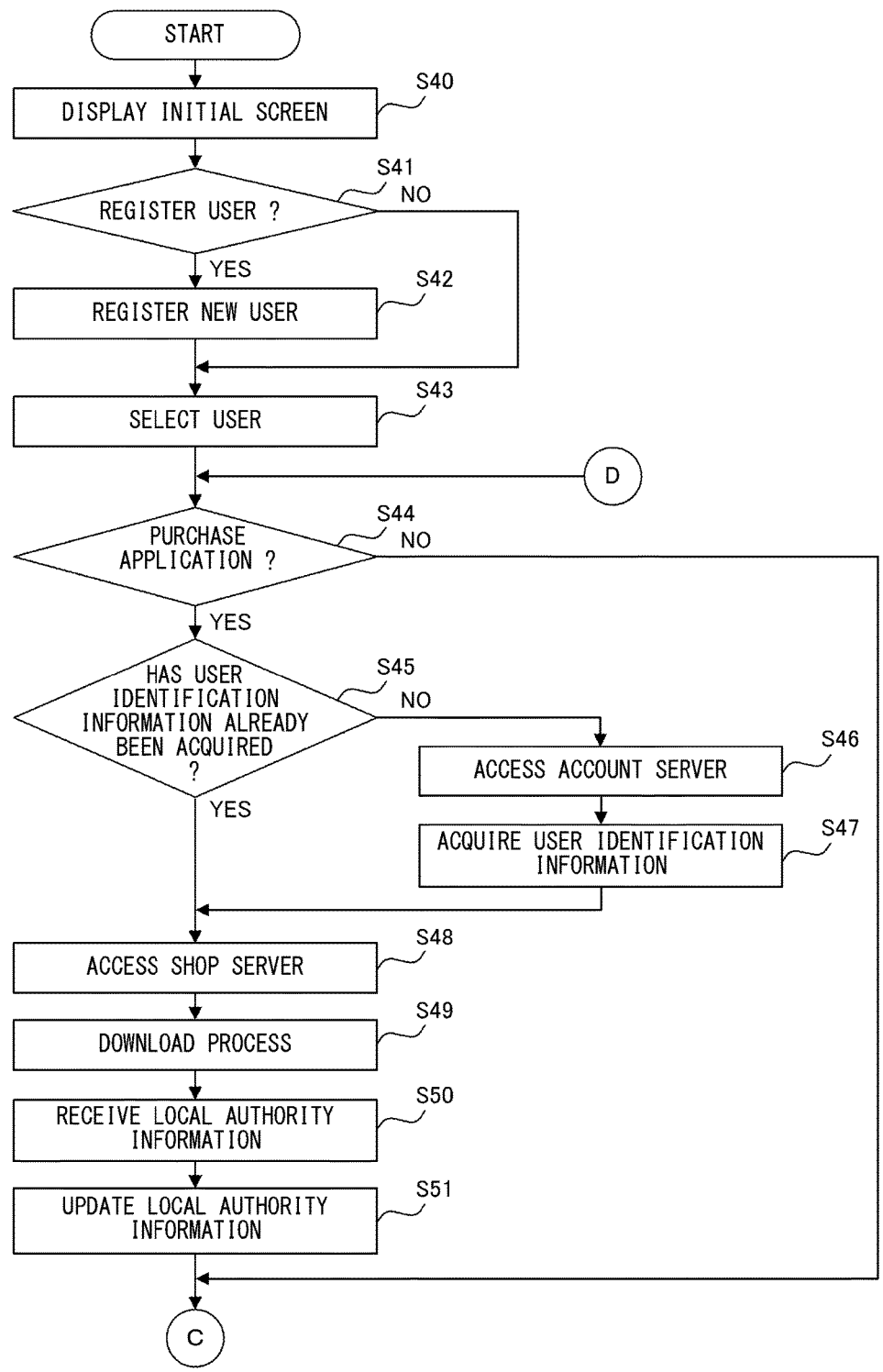
FIG. 9 is a flow chart showing a non-limiting example of a part of the flow of the processing performed by the information processing apparatus.
Figure 10:
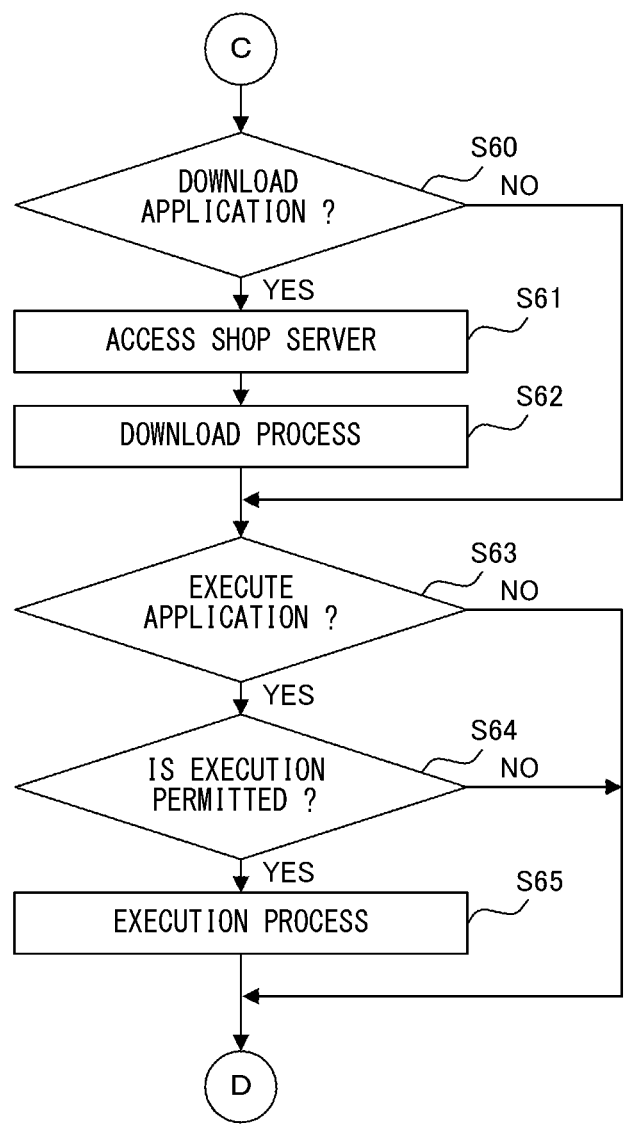
FIG. 10 is a flow chart showing a non-limiting example of another part of the flow of the processing performed by the information processing apparatus.

Next, with reference to flow charts of FIGS. 9 and 10, the operation of each information processing apparatus 30 is described. It should be noted that the processing shown in the flow charts is performed by the processor 31 in accordance with a predetermined computer program. The computer program may be installed in advance on the information processing apparatus 30, or may be provided to the information processing apparatus 30 through any computer-readable storage medium such as a CD or a DVD, or may be provided to the information processing apparatus 30 through communication with another information processing apparatus such as the server apparatus 10.

Referring to FIG. 9, in step S40, the processor 31 displays an initial screen on the display apparatus 35. A list of users registered in the information processing apparatus 30 (for example, first to fourth users shown in FIG. 6) is displayed on the initial screen on the basis of the registered user information stored in the storage device 32. It should be noted that if no user is registered in the information processing apparatus 30 or a new user is to be registered in the information processing apparatus 30, it is possible to register a user through the input apparatus 34.

In step S41, the processor 31 determines whether or not an instruction to register a user has been input through the input apparatus 34. If an instruction to register a user has been input, the processing proceeds to step S42. If not, the processing proceeds to step S43.

In step S42, on the basis of a user input, the processor 31 adds a new user to the registered user information stored in the storage device 32 (FIG. 6).

In step S43, on the basis of a user input, the processor 31 selects one user from among one or more users registered in the information processing apparatus 30. Consequently, the user selected in step S43 is considered as the user currently operating the information processing apparatus 30 (hereinafter referred to as "current user"). It should be noted that when selecting a user in step S43, the processor 31 may perform an authentication process using a password input and the like.

In step S44, the processor 31 determines whether or not an instruction to purchase an application has been input through the input apparatus 34. Then, if an instruction to purchase an application has been input, the processing proceeds to step S45. If not, the processing proceeds to step S60 in FIG. 10.

In step S45, the processor 31 determines whether or not the user identification information corresponding to the current user has already been acquired from the account server 20 (that is, whether or not the registered user information includes the user identification information corresponding to the current user). Then, if the user identification information corresponding to the current user has already been acquired, the processing proceeds to step S48. If not, the processing proceeds to step S46.

In step S46, the processor 31 accesses the account server 20 and performs processing required for acquiring user identification information. Specifically, the processor 31 causes the user to input, through the input apparatus 34, information such as a password required for acquiring user identification information, and transmits the input information to the account server 20.

In step S47, the processor 31 acquires the user identification information corresponding to the current user from the account server 20. The acquired user identification information is added to the registered user information as the user identification information corresponding to the current user.

In step S48, the processor 31 accesses the shop server 10 and transmits to the shop server 10 a request to purchase an application. At this time, information of the application to be purchased by the user, the apparatus identification information stored in the storage device 32, and the user identification information corresponding to the current user and included in the registered user information stored in the storage device 32 are transmitted to the shop server 10.

In step S49, the processor 31 downloads the currently purchased application from the shop server 10. The downloaded application is stored in the storage device 32.

In step S50, the processor 31 receives local authority information from the shop server 10.

In step S51, on the basis of the received local authority information, the processor 31 updates the local authority information stored in the storage device 32. Typically, the processor 31 overwrites the local authority information stored in the storage device 32, using the received local authority information.

Referring to FIG. 10, in step S60, the processor 31 determines whether or not an instruction to download an application has been input through the input apparatus 34. If an instruction to download an application has been input, the processing proceeds to step S61. If not, the processing proceeds to step S63.

In step S61, the processor 31 accesses the shop server 10 and transmits to the shop server 10 a request to download an application. At this time, information of the application to be downloaded by the user, the apparatus identification information stored in the storage device 32, and the user identification information corresponding to the current user and included in the registered user information stored in the storage device 32 are transmitted to the shop server 10. It should be noted that if the user identification information corresponding to the current user has not yet been acquired, information of the application to be downloaded and the apparatus identification information are transmitted to the shop server 10. In the exemplary embodiment, even if the user identification information has not yet been acquired, it is possible to download an application purchased in the past by another user of the same information processing apparatus 30.

In step S62, the processor 31 downloads from the shop server 10 the application that the processor 31 has made the request to download. The downloaded application is stored in the storage device 32.

In step S63, the processor 31 determines whether or not an instruction to execute the application has been input through the input apparatus 34. Then, if an instruction to execute the application has been input, the processing proceeds to step S64. If not, the processing returns to step S44 in FIG. 9.

In step S64, the processor 31 determines whether or not the current user is permitted to execute the application that the instruction has been given to execute. If the current user is permitted to execute the application, the processing proceeds to step S65. If not, the processing returns to step S44 in FIG. 9. Specifically, the processor 31 makes the determination on the basis of the local authority information stored in the storage device 32. In the exemplary embodiment, if the application that the instruction has been given to execute is an application purchased by the current user, or is an application purchased by another user of the information processing apparatus 30, or is an application that had been pre-installed on the information processing apparatus 30, the current user is permitted to execute the application.

In step S65, the process of executing the application is performed.

As described above, based on the exemplary embodiment, the shop server 10 can perform processing based not only on the user authority information corresponding to the current user of each information processing apparatus 30, but also on the user authority information corresponding to another user of the same information processing apparatus 30. Thus, as in the exemplary embodiment, it is possible to permit not only a certain user having purchased an application but also another user of the same information processing apparatus 30 to download or execute the application purchased by the certain user. That is, it is possible to give the same authority as that given to a certain user, also to another user of the same information processing apparatus.

In addition, based on the exemplary embodiment, the user authority information includes information regarding applications purchased by a corresponding user. This makes it possible to, with respect to each application, manage authority to download the application and authority to execute the application.

In addition, based on the exemplary embodiment, the shop server 10 manages the user authority information and the apparatus authority information. This makes it possible to prevent a malicious user from falsifying the user authority information and the apparatus authority information.

In addition, based on the exemplary embodiment, each information processing apparatus 30 stores the local authority information. Thus, when a user attempts to execute an application, the information processing apparatus 30 can determine, without accessing the shop server 10, whether or not the user is permitted to execute the application. It should be noted that as a countermeasure against a malicious user falsifying the local authority information once stored in the information processing apparatus 30, the latest local authority information may be periodically (for example, every time the information processing apparatus 30 accesses the shop server 10) generated and transmitted from the shop server 10 to the information processing apparatus 30, and the local authority information saved in the information processing apparatus 30 may be forcibly overwritten using the latest local authority information. In this case, the local authority information may be overwritten unconditionally, or may be overwritten only if a predetermined condition is satisfied (for example, if the user authority information and the apparatus authority information stored in the shop server 10 do not match the local authority information stored in the information processing apparatus 30).

In addition, based on the exemplary embodiment, the shop server 10 stores the apparatus authority information. This makes it possible to give authority based on the apparatus authority information to each of the users of each information processing apparatus 30 (for example, authority to download and execute an application that had been pre-installed on the information processing apparatus 30). It should be noted that the apparatus authority information can include not only information regarding pre-installed applications but also information indicating any authority given to the information processing apparatus. For example, if an application purchased by a user of the information processing apparatus 30 is an application that an unspecified user of the information processing apparatus 30 is permitted to download and execute, information regarding the application may be added to the apparatus authority information. Alternatively, a specific application (for example, a free application, an application that is not for sale, or the like) may be downloaded from the shop server 10 to the information processing apparatus 30, and information regarding the specific application may be added to the apparatus authority information.

In addition, based on the exemplary embodiment, the shop server 10 stores the user authority information indicating authority of each user and the apparatus authority information indicating authority of each information processing apparatus 30. Thus, for example, when one of a plurality of users of a certain information processing apparatus 30 newly purchases another information processing apparatus 30 and only the user starts to use the other information processing apparatus 30, it is only necessary to change the information processing apparatus 30 associated with the user authority information corresponding to the user, which is convenient. It should be noted that for example, when a certain user uses a plurality of information processing apparatuses 30, the plurality of information processing apparatuses 30 may be associated with the user authority information corresponding to the user (for example, the pieces of apparatus identification information of the plurality of information processing apparatuses 30 used by the user may be included in the user authority information corresponding to the user).

In addition, based on the exemplary embodiment, to generate the user authority information in the shop server 10, a user needs to acquire the user identification information through the account server 20 as described above, which is troublesome to the user. In contrast, regarding the apparatus authority information, when each information processing apparatus 30 has first accessed the shop server 10, the apparatus identification information stored in the storage device 32 is read by the processor 31 and automatically transmitted to the shop server 10, and the apparatus authority information is automatically generated, which saves the user the trouble.

(Variations)

It should be noted that in the exemplary embodiment, the description is given of the case where authority regarding an application is managed. Alternatively, in another exemplary embodiment, it is possible to manage not only authority regarding an application but also any authority related to each information processing apparatus 30. For example, it is also possible to manage authority to download an additional content to be used in an application (additional character data and additional stage data) to the information processing apparatus 30 and view the downloaded additional content, authority to download moving image data to the information processing apparatus 30, authority to display a specific website on the information processing apparatus 30, and the like.

In addition, in the exemplary embodiment, the description is given of the example where, if an application has been purchased by any one of the users of the same information processing apparatus 30, not only the user having purchased the application but also the other users of the information processing apparatus 30 are permitted to download and execute the application. Alternatively, in another exemplary embodiment, a condition for a user to be permitted to download and execute an application may be different depending on the application. For example, on the basis of sharable range information as shown in FIG. 11, the shop server 10 may manage authority to download and execute an application with respect to each user. In the example of FIG. 11, in the case of the application A and the application B, all users associated with the same information processing apparatus 30 as that of a user having purchased the application A or the application B are permitted to download and execute the application A or the application B. In the case of the application C, only a user having purchased the application C is permitted to download and execute the application C. In the case of the application D, only a user a predetermined age or over among all users associated with the same information processing apparatus 30 as that of a user having purchased the application D is permitted to download and execute the application D.

In addition, in the exemplary embodiment, the shop server 10 manages the user authority information and the apparatus authority information. Alternatively, in another exemplary embodiment, any server apparatus or any server system that can be accessed by the information processing apparatuses 30 may manage the user authority information and the apparatus authority information.

In addition, in the exemplary embodiment, in accordance with the reception of a request to purchase an application from the current user of each information processing apparatus 30, the shop server 10 generates the user authority information corresponding to the current user, where necessary. Alternatively, in another exemplary embodiment, while the shop server 10 and each information processing apparatus 30 are connected to each other, the user authority information corresponding to the current user or another user of the information processing apparatus 30 may be generated at any timing.

In addition, the processing performed by the shop server 10 in the exemplary embodiment may be performed by any server system. For example, a server system having a plurality of processors may be used instead of the shop server 10, and the processing may be performed by the plurality of processors. The plurality of processors may be provided together in the same information processing apparatus, or may be provided in different information processing apparatuses.

In addition, in the exemplary embodiment, the shop server 10 and the account server 20 are provided independently of each other. Alternatively, in another exemplary embodiment, one server having the functions of both the shop server 10 and the account server 20 may be provided instead of these two servers.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An authority management system comprising:
 a server system that includes at least one first hardware processor, a memory, and a first transceiver; and
 a first information processing apparatus that includes at least one second hardware processor and a second transceiver, the at least one second hardware processor configured to:
  register a plurality of users as users of the first information processing apparatus, the plurality of users including at least a first user and a second user; and
  communicate, using the second transceiver, with the server system, wherein the communication includes 1) a first request for the first user that is registered with the first information processing apparatus or 2) a second request for the second user that is registered with the first information processing apparatus for authorization to access digital content in connection with the first information processing apparatus,
 wherein the at least one first hardware processor of the server system is configured to:
  communicate, using the first transceiver, with the first information processing apparatus;
  store, to the memory and with respect to each of the plurality of users registered in the first information processing apparatus, user authority information indicating authority given to a corresponding user for accessing corresponding digital content, together with user identification information for identifying the corresponding user, the user authority information including first user authority information that corresponds to the first user and second user authority information that corresponds to the second user that is different from the first user;
  receive, via the first transceiver, the first or second request;
  in response to the received first request, perform an authorization determination to grant or deny access to digital content associated with the first request, the authorization determination based on both of the first user authority information and the second user authority information with respect to the digital content associated with the first request; and
  in response to the received second request, perform an authorization determination to grant or deny access to digital content associated with the second request, the authorization determination based on both of the first user authority information and the second user authority information with respect to the digital content associated with the second request,
 wherein the performed authorizations for the first and second requests are both additionally conditioned on determination that the first and second users are registered with the first information processing apparatus.

2. The authority management system according to claim 1, wherein the at least one first hardware processor of the server system is further configured to:
 in response to reception of the first user authority information from the first information processing apparatus and based on satisfaction of a predetermined condition, perform information processing based on the second user authority information, on the assumption that the first user is given the same authority as authority of the second user.

3. The authority management system according to claim 1, wherein the user authority information includes information indicating application software, and the at least one first hardware processor of the server system is further configured to:
provide authorization to for the first user to use each of application software indicated by the second user authority information.

4. The authority management system according to claim 1, wherein the user authority information includes information indicating application software that a user is permitted to execute in the first information processing apparatus.

5. The authority management system according to claim 1, wherein the at least one first hardware processor of the server system is further configured to:
store, to the memory and with respect to each one of a plurality of information processing apparatuses, which includes the first information processing apparatus, apparatus authority information indicating authority given to a corresponding one of the plurality of information processing apparatuses, together with apparatus identification information for identifying the corresponding one of the plurality of information processing apparatuses.

6. The authority management system according to claim 5, wherein
the apparatus authority information includes information indicating application software pre-installed on the corresponding one of the plurality of information processing apparatuses, and
the user authority information includes information indicating application software purchased by a user that corresponds to the user authority information.

7. The authority management system according to claim 6, wherein the at least one first hardware processor of the server system is further configured to:
in response to reception of a request to purchase application software, perform a charging process for charging the user currently operating the first information processing apparatus an amount of money based on the application software indicated by the request; and
update, in accordance with the performed charging process, the user authority information corresponding to the user so as to permit the user to execute the application software in the first information processing apparatus.

8. The authority management system according to claim 5, wherein
the user authority information is generated on the basis input provided to the first information processing apparatus, and
the apparatus authority information is automatically generated independent of user provided input.

9. The authority management system according to claim 4, wherein the at least one first hardware processor of the server system is further configured to:
when the server system has communicated, via the first transceiver, with the first information processing apparatus, transmit, using the first transceiver and with respect to each of pieces of the user authority information associated with the first information processing apparatus, information indicating application software that a user corresponding to the piece of the user authority information is permitted to execute in the first information processing apparatus, as local user authority information to the first information processing apparatus, and wherein the at least one second hardware processor of the first information processing apparatus is further configured to:
receive, via the second transceiver, the transmitted local user authority information and store the local user authority information to local memory storage; and
determine, on the basis of the stored local user authority information, whether or not the application software can be executed in the first information processing apparatus.

10. The authority management system according to claim 9, wherein the at least one first hardware processor of the server system is further configured to:
when the server system has communicated with the first information processing apparatus, transmit, unconditionally or if a predetermined condition is satisfied, the latest local user authority information based on the user authority information associated with the first information processing apparatus, and
wherein the at least one second hardware processor is further configured to:
on the basis of the latest transmitted local user authority information, update the stored local user authority information.

11. A server system comprising:
a transceiver configured to communicate with an information processing apparatus;
a processing system that includes at least one hardware processor, the processing system configured to:
with respect to each of a plurality of users registered in the information processing apparatus, store user authority information indicating authority given to a corresponding user for accessing digital content together with user identification information for identifying the corresponding user, the user authority information including first user authority information that corresponds to a first user and second user authority information that corresponds to a second user that is different from the first user;
receive, via the transceiver and with the information processing apparatus, communication that includes at least 1) a first request for the first user that is registered with the information processing apparatus or 2) a second request for the second user that is registered with the information processing apparatus for authorization to access digital content in connection with the information processing apparatus;
in response to reception of the first request, perform an authorization determination to grant or deny access to first digital content associated with the first request, the authorization determination based on both of the first user authority information and the second user authority information with respect to the first digital content associated with the first request; and
in response to reception of the second request, perform an authorization determination to grant or deny access to second digital content associated with the second request, the authorization determination based on both of the first user authority information and the second user authority information with respect to the second digital content associated with the second request,
wherein the performed authorization determinations for the first and second requests are both additionally conditioned on determination that the first and second users are registered with the first information processing apparatus.

12. A non-transitory computer-readable storage medium having stored therein an authority management program to be executed by a computer of a server system including a transceiver configured to communicate with an information processing apparatus, the authority management program comprising instructions that cause the computer to execute:

with respect to each of a plurality of users registered in the information processing apparatus, storing user authority information indicating authority given to the user for accessing corresponding digital content, together with user identification information for identifying the user, the user authority information including first user authority information that corresponds to a first user and second user authority information that corresponds to a second user that is different from the first user;

process communications, received via the transceiver and from the information processing apparatus, that include at least 1) a first request for the first user that is registered with the information processing apparatus and 2) a second request for the second user that is registered with the information processing apparatus for authorization to access digital content in connection with the information processing apparatus;

in response to the first request, perform an authorization determination to grant or deny use of first digital content associated with the first request, the authorization determination based on both of the first user authority information and the second user authority information with respect to the first digital content associated with the first request; and in response to the second request, perform an authorization determination to grant or deny use of second digital content associated with the second request, the authorization determination based on both of the first user authority information and the second user authority information with respect to the second digital content associated with the second request, wherein the performed authorization determinations for the first and second requests are both additionally conditioned on determination that the first and second users are registered with the first information processing apparatus.

13. An authority management method to be executed by a server system including a transceiver configured to communicate with an information processing apparatus, the authority management method comprising:

with respect to each of a plurality of users registered in the information processing apparatus, storing user authority information indicating authority given to the user for accessing digital content, together with user identification information for identifying the user, the user authority information including first user authority information that corresponds to a first user and second user authority information that corresponds to a second user that is different from the first user;

receiving, via the transceiver and with the information processing apparatus, communication that includes at least 1) a first request for the first user that is registered with the information processing apparatus or 2) a second request for the second user that is registered with the information processing apparatus for authorization to access digital content in connection with the information processing apparatus;

in response to reception of the first request, performing an authorization determination to grant or deny access to first digital content associated with the first request, the authorization determination based on both of the first user authority information and the second user authority information with respect to the first digital content; and in response to reception of the second request, performing an authorization determination to grant or deny access to second digital content associated with the second request, the authorization determination based on both of the first user authority information and the second user authority information with respect to the second digital content, wherein the performed authorization determinations for the first and second requests are both additionally conditioned on determination that the first and second users are registered with the first information processing apparatus.

* * * * *